Feb. 23, 1943. W. M. NASH 2,311,854
DEVICE FOR MAKING PERFORATED RESILIENT COVERED ROLLS
Filed July 23, 1941 2 Sheets-Sheet 2
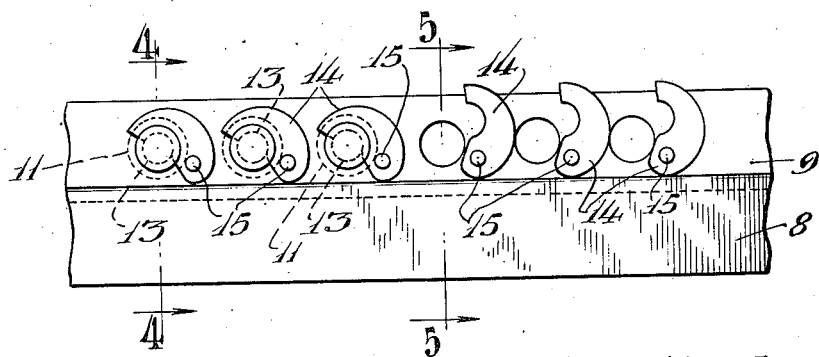
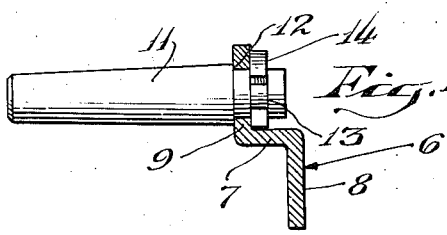
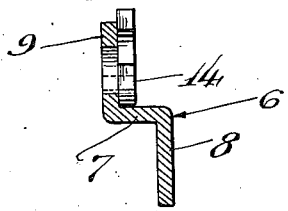
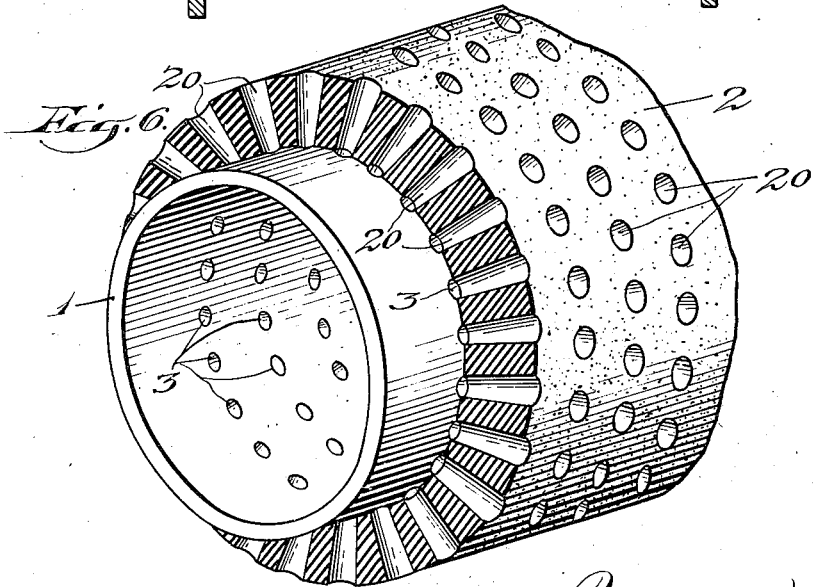
Inventor:
William M. Nash
by Lee J. Gary
Attorney.

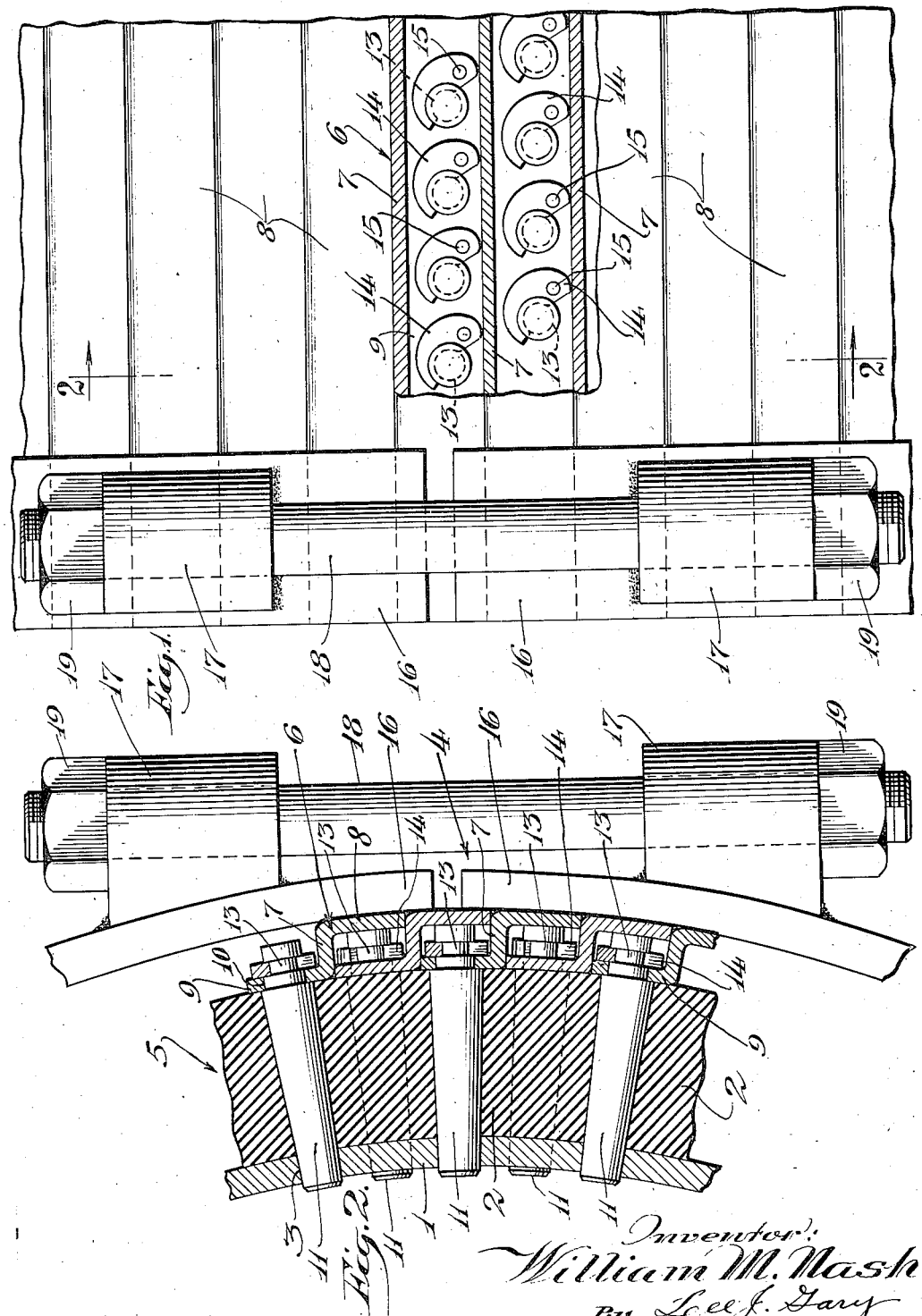

Patented Feb. 23, 1943

2,311,854

UNITED STATES PATENT OFFICE 2,311,854

DEVICE FOR MAKING PERFORATED RESILIENT COVERED ROLLS

William M. Nash, Menasha, Wis., assignor of one-half to Stanley A. Martin, De Pere, Wis., one-eighth to Marie Duvall Nash, Neenah, Wis., one-eighth to Mary Nash Jones, Neenah, Wis., and one-eighth to Roy A. Nash, Bronxville, N. Y.

Application July 23, 1941, Serial No. 403,616

6 Claims. (Cl. 18—36)

This invention relates to a device for making perforated rubber covered rolls of the type employed as suction press rolls in the paper industry, and refers specifically to a form for molding the rubber covers upon a perforated hollow metal shell which comprises, means for providing perforations in the rubber cover in alignment with the perforations in the shell.

Perforated rubber covered rolls have heretofore been constructed by winding unvulcanized rubber strips upon a previously perforated shell and then by means of rather intricate apparatus, whereby a punching means is aligned with the perforations in the shell, punching holes in the rubber cover.

Another method heretofore proposed for manufacturing perforated rubber covered rolls comprises winding unvulcanized rubber strips upon a previously perforated shell to build up a desired thickness of rubber and then driving pegs or spikes from the inside of the shell through the perforations therein and through the rubber cover.

Both of these methods are tedious and expensive and good adherence of the rubber to the shell is difficult of attainment.

My present invention contemplates a device whereby a rubber cover can be formed in one piece having perforations which properly register with the perforations in the shell; the rubber being poured in the form comprising my invention, which circumscribes and is spaced from the shell, the form carrying radially disposed pegs which protrude from the form into the shell perforations and function as cores to provide perforations in the molded rubber cover.

The objects and advantages of my invention will be apparent from the accompanying drawings and following detailed description.

In the drawings,

Fig. 1 is a fragmentary plan view, parts being broken away and parts being shown in section, of my improved device.

Fig. 2 is a sectional view taken on the line 2—2 of Fig. 1.

Fig. 3 is a detailed top plan view of one section comprising my form.

Fig. 4 is a sectional view taken on the line 4—4 of Fig. 3.

Fig. 5 is a sectional view taken on the line 5—5 of Fig. 3.

Fig. 6 is a fragmentary detailed perspective view of a perforated rubber covered roll made by my device.

Referring in detail to the drawings, I indicates a hollow metallic cylinder or shell, usually constructed of brass, upon which a rubber covering 2 is adapted to be mounted. The shell 1 is provided with a plurality of appropriately spaced apertures 3 through which suction may be established, as in the case of a suction press or couch roll employed in the paper-making art.

To mount the rubber cover 2 upon the shell a form 4 is employed which is generally coaxially disposed with respect to the shell 1 and spaced radially from the outer surface of the shell. A space 5 is thereby provided between the shell and form into which rubber or other resilient material may be poured while in flowable condition.

The form 4 comprises a plurality of elongated plates 6 of substantially Z-section, having webs 7 and oppositely offset flanges 8 and 9. The plates 6 are adapted to extend with their longitudinal axes parallel to the longitudinal axis of the shell 1, adjacent plates overlapping each other, that is, a flange 8 being disposed over a flange 9 of the adjacent plate and the webs 7 being positioned radially.

As a feature of my invention, the flanges 9 are provided with longitudinally spaced apertures 10 which are adapted to register radially with the apertures 3 in the shell 1. A peg 11 is adapted to be positioned in each aperture 3, the opposite end extending through a corresponding aperture 10.

The pegs 11 are preferably tapered so as to conveniently space the plates 6 from the shell by the wedging action of the ends of the pegs in the apertures 3, and to facilitate the outward removal of the pegs after the rubber cover 2 has been poured and cured. Adjacent the outer ends of the pegs, a shoulder 12 is formed whereby the larger tapered portions abut against the flanges 9. Intermediate the shoulder and end of the peg, the peg is provided with an annular groove 13. A latch 14 is pivotally mounted, as at 15, adjacent each aperture 10 and is swingable to a position to engage the groove 13 to lock the pegs to the flanges 9. In this manner the pegs are locked at both ends, by the wedging action in the apertures 3 and by the latches 14.

To hold the plates firmly in position as a unitary cylindrical form clamping rings 16 formed in a plurality of arcuate sections circumscribe the plates. Each section of the ring 16 carries apertured lugs 17 through which bolts 18 pass, said bolts being drawn taut by nuts 19 threaded upon the ends of said bolts. Preferably the rings 16 are made semi-circular and, depending upon the length of the roll, as many rings as desired may be employed, the rings being spaced axially only the length of the roll.

With the form assembled, as hereinbefore described, and the pegs 11 in position with the clamping rings tightened, the rubber or resilient covering material is poured in the space 5 wherein the material is set and cured. After curing the clamping rings may be removed and the plates 6 and pegs 11 also removed leaving a structure such as shown in Fig. 6.

One of the disadvantages heretofore encountered in the manufacture of rubber covered rolls is that in order to punch or drill the holes in the rubber cover, the cover must be relatively hard, since it is extremely difficult to drill or punch holes in relatively soft rubber. Hence, perforated rubber covered rolls available to the industry heretofore have been harder than desired for pressing and couching work. By the use of my invention, the softness or hardness of the cover is not dependent upon manufacturing expediency but is controlled merely by the compounding and curing of the rubber. Therefore, press and couch rolls may be constructed which are soft enough to meet the exacting needs of the art.

In addition, my device is such that a wide latitude and variety of aperture spacing may be obtained merely by plugging up any predetermined apertures 10 in the flanges 9 instead of inserting pegs 11 in said apertures. Another advantage of my invention resides in the fact that radially tapered holes 20 which diverge radially outwardly can be provided in the rubber cover, which is impossible of achievement in drilling or punching the holes from the inside of the shell.

I claim as my invention:

1. A device for molding a perforated resilient cover on a perforated metallic cylindrical shell to form a resilient covered roll for use in a paper making machine which comprises, a plurality of removable plates adapted to be disposed longitudinally parallel to the length of the shell and in radially spaced relation outwardly from the surface of said shell, to provide a space for the reception of the covering material, a plurality of pegs adapted to be positioned at one end in the perforations in said shell, means carried by said plates for supporting the opposite ends of said pegs to dispose said pegs radially between the shell and said plates, and means for locking said plates in contacting relation to each other and in circumscribing position around said shell.

2. A device for molding a perforated resilient cover on a perforated metallic cylindrical shell to form a resilient covered roll for use in a paper making machine which comprises, a plurality of removable plates adapted to be disposed longitudinally parallel to the length of the shell and in radially spaced relation outwardly from the surface of said shell, to provide a space for the reception of a modable covering material, a plurality of pegs adapted to be positioned at one end in the perforations in said shell, said plates being provided with apertures through which the opposite ends of said pegs protrude to support said pegs radially between the shell and said plates, and means for locking said plates in contacting relation to each other and in circumscribing position around said shell.

3. A device for molding a perforated resilient cover on a perforated metallic cylindrical shell to form a resilient covered roll for use in a paper making machine which comprises, a plurality of overlapping removable plates adapted to be disposed longitudinally parallel to the length of the shell and in radially spaced relation outwardly from the surface of said shell, to provide a space for the reception of a moldable covering material, a plurality of pegs adapted to be positioned at one end in the perforations in said shell, means carried by said plates for supporting the opposite ends of said pegs to dispose said pegs radially between the shell and said plates, and means for locking said plates in contacting relation to each other and in circumscribing position around said shell.

4. A device for molding a perforated resilient cover on a perforated metallic cylindrical shell to form a resilient covered roll for use in a paper making machine which comprises, a plurality of removable plates adapted to be disposed longitudinally parallel to the length of the shell and in radially spaced relation outwardly from the surface of said shell, to provide a space for the reception of a modable covering material, a plurality of pegs adapted to be positioned at one end in the perforations in said shell, latches carried by said plates for locking the opposite ends of said pegs to hold said pegs radially between the shell and said plates, and means for locking said plates in contacting relation to each other and in circumscribing position around said shell.

5. A device for molding a perforated resilient cover on a perforated metallic cylindrical shell to form a resilient covered roll for use in a paper making machine which comprises, a plurality of removable plates adapted to be disposed longitudinally parallel to the length of the shell and in radially spaced relation outwardly from the surface of the shell to provide an annular space between the plates and the shell for the reception of a moldable covering material, said plates being substantially Z-shaped in section, each having two offset flanges, the flange of one plate overlapping the offset flange of an adjacent plate, a plurality of pegs adapted to be positioned at one end in the perforations in the shell, one of the flanges of each plate being provided with apertures through which the opposite ends of said pegs protrude to support said pegs radially between the shell and said plates, and means for locking said plates in contacting relation to each other and in circumscribing position around said shell.

6. A device for molding a perforated resilient cover on a perforated metallic cylindrical shell to form a resilient covered roll for use in a paper making machine which comprises, a plurality of removable plates adapted to be disposed longitudinally parallel to the length of the shell and in radially spaced relation outwardly from the surface of the shell to provide an annular space between the plates and the shell for the reception of a moldable covering material, said plates being substantially Z-shaped in section, each having two offset flanges, the flange of one plate overlapping the offset flange of an adjacent plate, a plurality of pegs adapted to be positioned at one end in the perforations in the shell, one of the flanges of each plate being provided with apertures through which the opposite ends of said pegs protrude to support said pegs radially between the shell and said plates, and means for locking said plates in contacting relation to each other and in circumscribing position around said shell, said means comprising a locking ring circumscribing said plates.

WILLIAM M. NASH.